Inventor
Angel G. D. Valle
By
Attorney

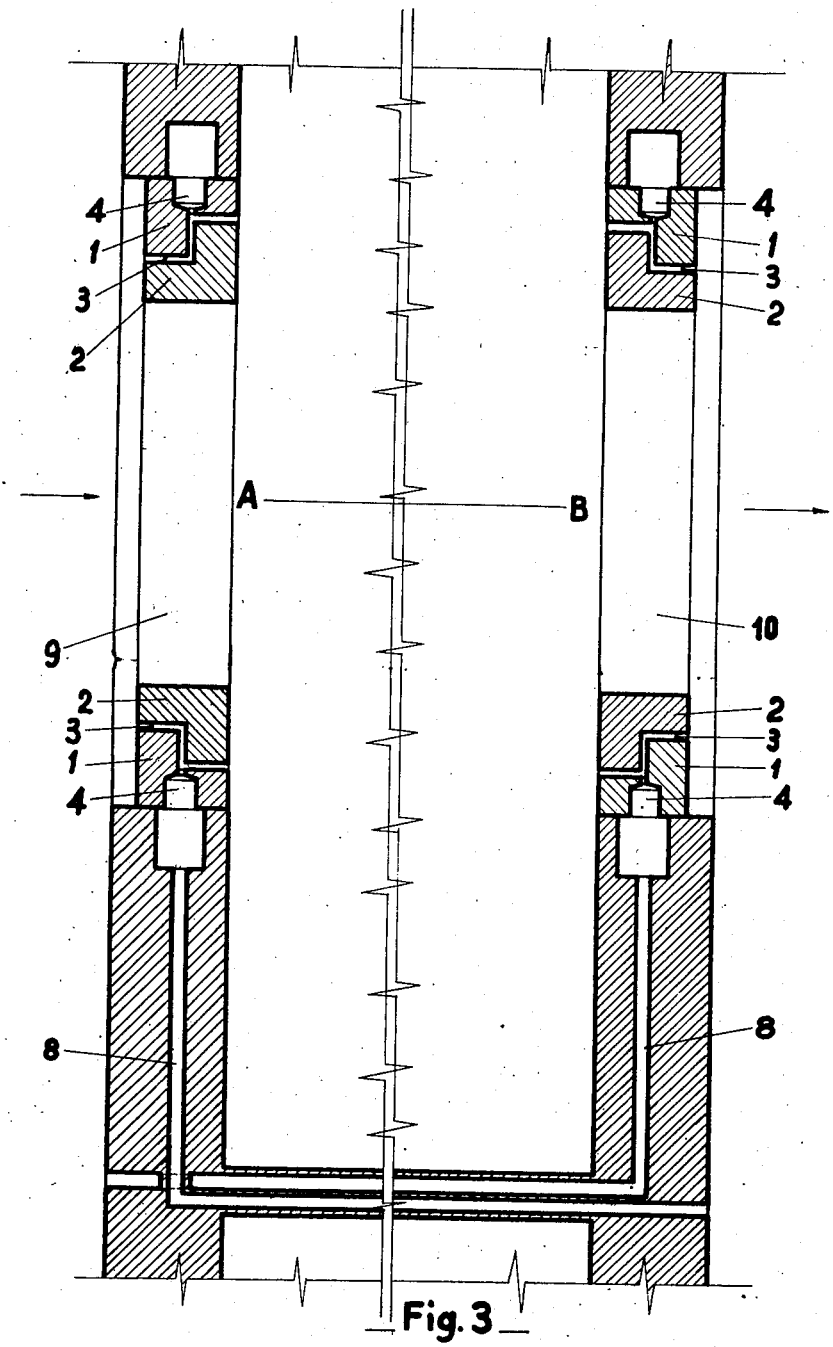

Feb. 9, 1954  A. GONZALEZ DEL VALLE  2,668,333
AIR TIGHT JOINT FOR WINDOW, DOORS, AND THE LIKE
Filed Nov. 2, 1949  4 Sheets-Sheet 3

Inventor
Angel G. D. Valle
By
Attorney

Feb. 9, 1954  A. GONZALEZ DEL VALLE  2,668,333
AIR TIGHT JOINT FOR WINDOW, DOORS, AND THE LIKE
Filed Nov. 2, 1949  4 Sheets-Sheet 4
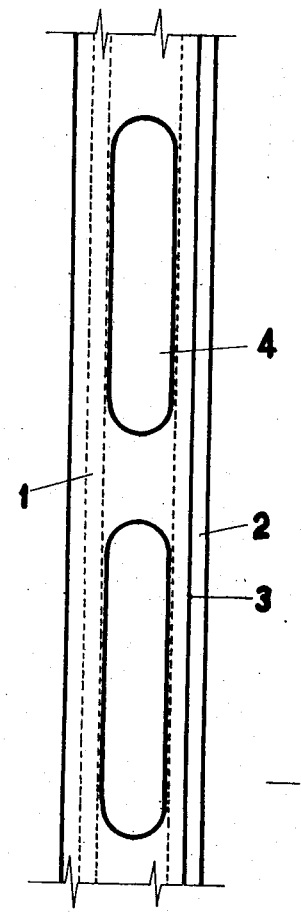
_Fig. 7_
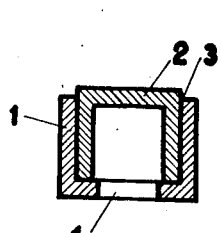
_Fig. 9_
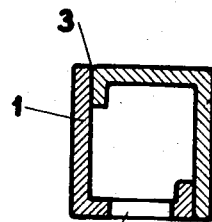
_Fig. 8_
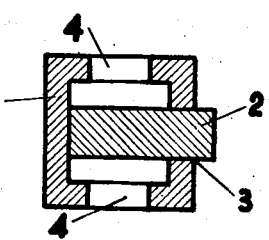
_Fig. 10_
Inventor
Angel G. D. Valle
By
Attorney Patented Feb. 9, 1954

2,668,333

UNITED STATES PATENT OFFICE 2,668,333

AIR TIGHT JOINT FOR WINDOWS, DOORS, AND THE LIKE

Angel Gonzalez del Valle, Madrid, Spain

Application November 2, 1949, Serial No. 125,121

Claims priority, application Spain November 2, 1948

6 Claims. (Cl. 20—40)

The invention relates to systems for preventing the loss of heat by convection of the air flow through the joints in windows, doors and the like, whether in rooms or in vehicles.

It is well known that the joint between the door or window frame and the casement or sash is never air-tight. This always causes the penetration of more or less air which, besides causing a loss of heat (this loss of heat being estimated to be about 30 per cent of the total amount required to maintain a comfortable temperature in the room), may constitute a source of trouble and danger in the form of drafts within the room or the like.

In order to overcome this inconvenience, attempts have been made which can generally be said to fall in two classes: those tending to increase the air-tightness of the joint between the door or window frame and the casement or sash by the insertion of sealing means, and those wherein the air penetrating into the room is deflected to change its original direction.

The first solution is unsatisfactory on several grounds: it renders the construction more expensive, interferes with the handling of the window or door and, finally, it loses efficiency with use and age.

The system of the second group produces no effect with regard to the difference of pressure between the outside and the inside, serving only to reduce the direct action of the air.

From the foregoing it will be seen that the problem of preventing the influence of the penetration of air through the joints in doors, windows and the like remains heretofore unsolved.

Accordingly, the object of this invention is to find a real solution to this problem and consequently the invention provides a system of the kind mentioned which is simple in construction and installation, effective in operation, without difficulties in its use and stable in its properties. Thus, the system according to the invention shows none of the drawbacks inherent to the systems of the prior art.

The system of the invention is characterized in that from points located in the path of the air particles entering the joint between the door or window frame and the casement or sash, ducts are provided to enable the air to easily escape towards the outside.

According to a first embodiment of the invention, the air from the outside is led to a duct which causes an expansion of this air, thereby creating regions at a pressure lower than that existing in the joint and a suction being transmitted to the zone separating the two portions of the joint.

According to another embodiment of the invention the pressure in the middle portion of the joint receiving the action of the air is reduced by the fact that this pressure is transmitted by means of a passage either to the middle portion of a joint or joints in windows located in a part of the building or vehicle sheltered from the wind (through which joints the air will pass to the outside) or directly to a point of the outside sheltered from the wind.

In either or both embodiments the result is obtained by means of a system of ducts placing points of the air stream lines traversing the joints in communication with other points of a system of ducts so that under the influence of the pressure originated by the air, the difference of pressure between the middle portion of the said stream lines corresponding to the doors or windows upon which the air is actuating and those belonging to the doors or windows which are not under this influence is decreased or even reversed.

In other words the invention is based on the fact that the pressure of the air is diminished upon traversing the portion of a joint corresponding to the front part of the frame if an easier outlet is established from the area separating both parts of this frame to a point at the outside where no overpressure is produced, or where the wind causes a decrease of the pressure or even where the wind creates an increase of the pressure.

The area separating the joints on the frames of a building or vehicle will therefore be at a substantially steady pressure and accordingly no air draught will be created within a building or vehicle.

The invention will become apparent from the following description which is given with reference to the accompanying drawings in which:

Fig. 3 is a cross-section through a pair of window frames connected by a duct system according to another embodiment of the invention.

Fig. 7 is an elevation view of a metallic frame and is similar in other respects to Fig. 4.

Fig. 8 is a cross-section view of Fig. 7.

Fig. 9 is a view showing a cross-section through a part of a sash window.

Fig. 10 is similar to Fig. 9, but illustrates an improved arrangement of the ducts according to the invention.

Figure 1:
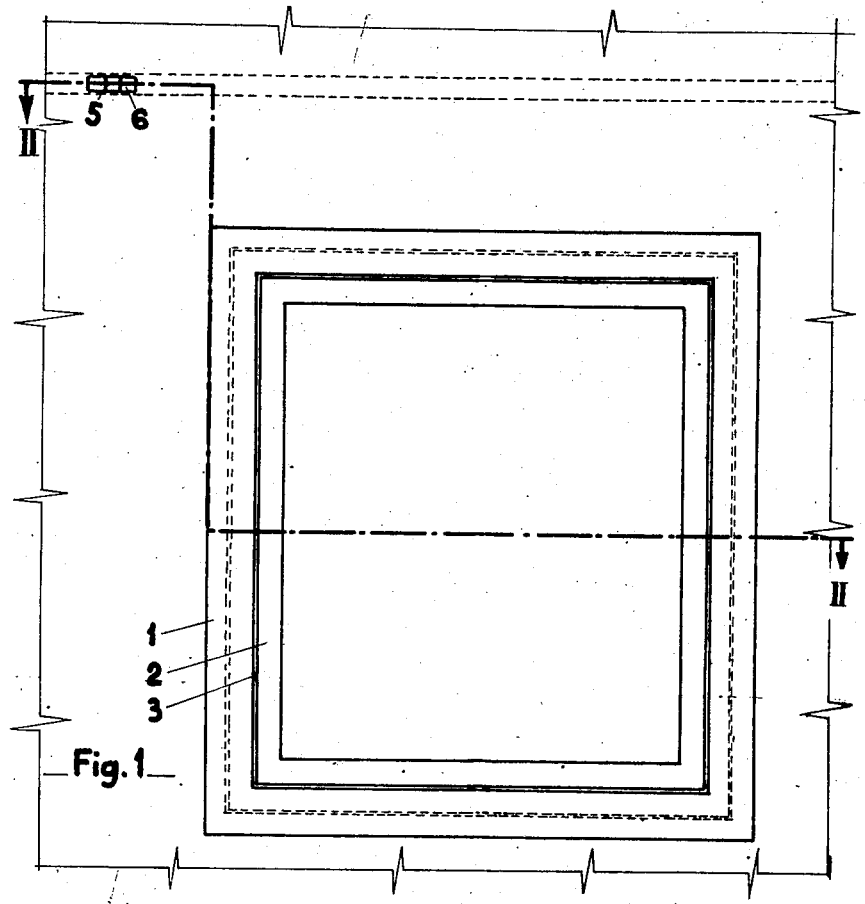
Fig. 1 shows a front view of a window frame according to one embodiment of the invention.
Figure 2:
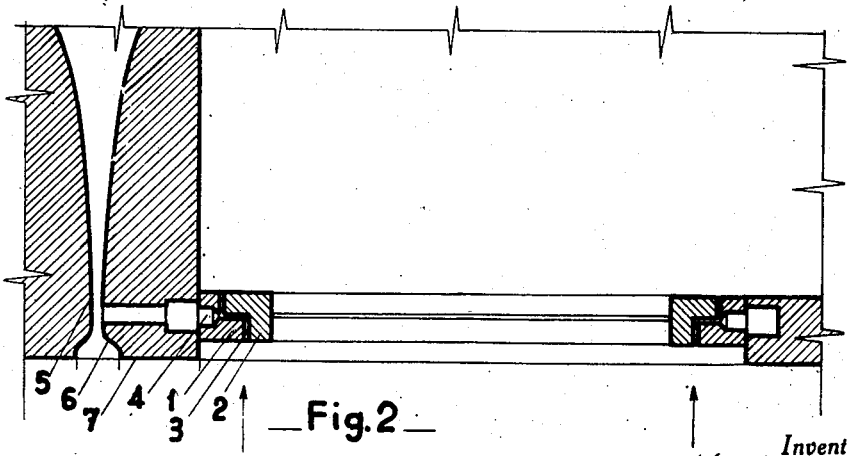
Fig. 2 shows a section on the line II—II of Fig. 1.

With reference now to the drawings and particularly to Figs. 1 and 2, it will be seen that the assembly is constituted by the usual window frame 1 and casement frame 2 separated by the joint 3, the size of which has obviously been exaggerated in the drawing. It is supposed that the direction of the air or wind is according to the arrows (Fig. 2).

In accordance with the invention, a duct 4 is made in the frame 1, said duct 4 being continued through the wall and opening perpendicularly into the throat of a Venturi-like passage 5 which has its inlet opening 6 in the same face 7 of the enclosure as the window and its outlet opening in the opposite face (not shown) of the enclosure. Thus, the inlet opening 6 is exposed to the same wind conditions as the joint 3.

In considering Figure 2 it will be noted that the passage 5, upon passage of the wind therethrough, functions as an air pump with respect to the area of the joint 3 exposed to the wind.

Logically, the extension of the duct 4 will be made to end in that portion of the passage 5 where the suction is the highest and as the suction effect is primarily dependent on the velocity of the wind entering the passage 5, it will be immediately evident that the efficiency of the system according to the invention will not be impaired with high wind velocities but on the contrary and for the reason stated, the efficiency will then be increased. The suction through the duct will withdraw any air penetrating the joint 3 and thereby prevent the penetration of the air or wind into the room to be protected.

Figure 3 illustrates another embodiment of the invention and which is adapted for a pair of windows on opposite sides of an enclosed area A—B, one window 9 being on the side exposed to the wind and the other window 10 being on the side sheltered from the wind (the direction of the wind being indicated by the arrows). Each of the window frames 1 has the duct 4 in communication with a passage opening through the opposite side of the enclosure. In this case, however, the duct 4 opens axially into a passage 8 that may be of substantially uniform section but of greater capacity than the joint 3. Specifically, the ducts 4 in the frame 1 surrounding the window 9 open into a passage 8 that extends through the walls of the enclosure A—B and has its outlet in the opposite side thereof. Similarly, the ducts 4 surrounding the window 10 open into another passage 8 which opens through the wall containing the window 9. Obviously, a plurality of ducts 4 surrounding one or more windows in the same side of the enclosure may communicate with a single passage 8.

In the modification, the air forced through the joint 3 is not withdrawn by suction as in the embodiment with the venturi 5, but follows the axial passage formed by the joint 3, duct 4 and passage 8 rather than turning at right angles within the joint 3 and flowing into the enclosure.

The shape of the sections of the duct 4 does not affect the substance of the invention as the said duct may have a cylindrical, conical elongated, etc., form. Figs. 4 to 10 illustrate a preferred arrangement of this duct as applied to frames of different construction.

Figure 5:
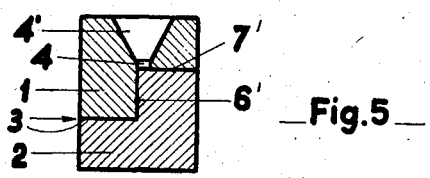
Fig. 5 is a cross-section on the line V—V of Fig. 4.
Figure 4:
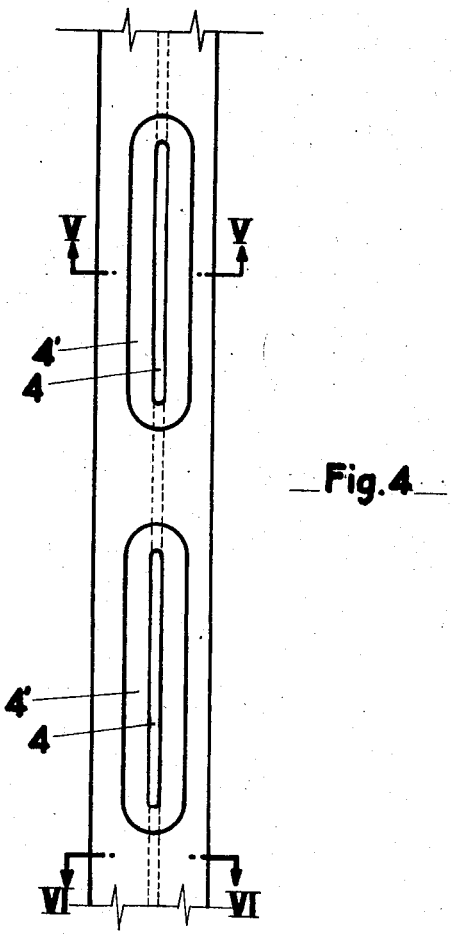
Fig. 4 shows an elevation view of a wooden frame illustrating a typical structure of the initial part of the duct.
Figure 6:
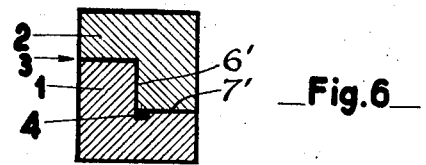
Fig. 6 is a cross-section on the line VI—VI of Fig. 4.

The wooden frame shown in Figs. 4 to 6 is of the usual type. 1 is the window frame and 2 the casement frame. The duct 4 begins approximately at the middle portion of the joint 3 and is advantageously constituted by a slot along the inner side of the bars of frame 1. This slot flares outwardly towards the opposite side of the frame to form the duct 4' which traverses the entire cross-section of the frame (see Fig. 5). This flared portion 4' of the duct is not continuous but arranged at spaced intervals thus forming a series of openings (see Fig. 4) through which the air is bypassed to the passages 5 or 8 provided within the wall of the building as above explained.

It has been found convenient to arrange the duct 4 so that it is aligned with that portion of the joint 3 which, in the direction of penetration of the air, immediately precedes the duct 4. Thus (see Fig. 5) the air entering the joint 3 in the direction of the arrow advances through the portion 6' and upon arriving at the end of the latter it finds two passages: the duct 4 and the portion 7' of the joint. As the duct 4 constitutes a continuation of the portion 6', while the portion 7' is perpendicular to the portion 6', the air obviously proceeds along the way offering less resistance, that is, into the duct 4.

Figs. 7 and 8 illustrate the arrangement of the ducts 4 in metal frames. In this case the duct 4 is constituted by a series of openings in the part 1 of the frame.

The same arrangement is used in the frame shown in Figs. 9 and 10, both figures illustrating a cross-section through the frame of a sash window. However, in considering Fig. 10, it may be appreciated that instead of a single duct 4, two ducts are disposed substantially opposite to one another the protecting action of the system of the invention being thereby materially enhanced.

In the practical application of the invention, the duct system above described may be partly or entirely constituted (with the exception of the duct 4) by the hollow spaces usually left in buildings between the partition walls and within the floors, although special ducts might be arranged extending entirely or partially in the inside or in the outside of these hollow spaces.

Similarly in a vehicle or the like either the hollow spaces existing between the parts of the body may be used to this end or special ducts may be arranged extending entirely or partly in the inside or in the outside of the body.

It is to be understood that the embodiments which I have shown are intended to illustrate suitable means for carrying out the invention, but that details in construction may be changed without departing from the spirit of my invention as claimed.

Having fully described my invention, what I claim as new is:

1. In combination with an enclosure having walls at least one of which has an opening therein formed with rabbetted edge surfaces, a closure for said opening having rabbetted edge surfaces to nest within said opening edge surfaces to form a rabbetted joint, said one wall having a duct opening through said opening edge surfaces adjacent to and substantially co-planar with one of said rabbetted surfaces to form a continuation of a branch of the joint at said surface, said enclosure having a passage through its walls in communication with said duct and opening through the outer side of a wall other than said opening containing wall, said duct and said passage having a greater cross-sectional area than the joint between said opening and closure edge surfaces.

2. The combination set forth in claim 1 wherein said passage terminates at its communication with said duct and is coplanar with said duct and said joint branch.

3. The combination set forth in claim 1 wherein said joint branch and duct are coplanar with said opening containing wall.

4. The combination set forth in claim 1 wherein said passage opens through the wall opposite said opening containing wall.

5. The combination set forth in claim 1 wherein said passage is of Venturi-like shape having a throat portion and has an inlet in the opening containing wall, and said duct opens into said throat portion.

6. The combination set forth in claim 1 wherein said duct comprises a channel in the wall surrounding the opening, and slots spaced longitudinally of said channel and extending between said channel and said passage to provide communication between said channel and said passage.

ANGEL GONZALEZ DEL VALLE.

References Cited in the file of this patent

UNITED STATES PATENTS

| Number | Name | Date |
|---|---|---|
| 588,969 | Finagin | Aug. 31, 1897 |
| 802,871 | Matton | Oct. 24, 1905 |
| 1,324,059 | Mead | Dec. 9, 1919 |
| 1,606,659 | Moore | Nov. 9, 1926 |
| 2,419,806 | Wendel | Apr. 29, 1947 |

FOREIGN PATENTS

| Number | Country | Date |
|---|---|---|
| 499,251 | Great Britain | Jan. 20, 1939 |